(12) United States Patent
Ghoneim et al.

(10) Patent No.: US 6,205,391 B1
(45) Date of Patent: Mar. 20, 2001

(54) VEHICLE YAW CONTROL BASED ON YAW RATE ESTIMATE

(75) Inventors: Youssef Ahmed Ghoneim, Macomb Township, Macomb County; David Michael Sidlosky, Huntington Woods; William Chin-Woei Lin, Troy, all of MI (US)

(73) Assignees: General Motors Corporation, Detroit, MI (US); Delphi Technologies Inc., Troy, MI (US)

( * ) Notice: Subject to any disclaimer, the term of this patent is extended or adjusted under 35 U.S.C. 154(b) by 0 days.

(21) Appl. No.: 09/080,372

(22) Filed: May 18, 1998

(51) Int. Cl.$^7$ .............................. G06F 19/00; G06F 7/00; G06G 7/00
(52) U.S. Cl. ............................... 701/70; 701/36; 701/73; 701/79; 701/89; 180/167; 180/170; 303/146; 303/147; 303/155; 303/140; 342/70
(58) Field of Search .................. 701/70, 36, 73, 701/79, 89; 180/167, 170; 303/146, 147, 155, 140; 342/70

(56) References Cited

U.S. PATENT DOCUMENTS

| | | | |
|---|---|---|---|
| 4,834,205 | 5/1989 | Mizuno et al. | 180/141 |
| 5,063,514 | 11/1991 | Headley et al. | 364/426.02 |
| 5,172,961 | 12/1992 | Inoue et al. | 303/100 |

(List continued on next page.)

FOREIGN PATENT DOCUMENTS

| | | |
|---|---|---|
| 41 23 235 C1 | 11/1992 | (DE) . |
| 41 21 954 A1 | 1/1993 | (DE) . |
| 42 00 061 A1 | 7/1993 | (DE) . |

(List continued on next page.)

OTHER PUBLICATIONS

May the Cornering Force be with You; Popular Mechanics; Dec. 1995, pp. 74–77.

Stable as She Goes: Don Sherman, Automotive Industries, May 1995.

The Spin Doctors: Don Sherman, 12PS95.

(List continued on next page.)

*Primary Examiner*—William A. Cuchlinski, Jr.
*Assistant Examiner*—Ronnie Mancho
(74) *Attorney, Agent, or Firm*—Christopher DeVries

(57) ABSTRACT

An improved vehicle yaw control that does not require a yaw sensor, wherein the validity of an estimate of vehicle yaw is determined and used to select an appropriate control methodology. The vehicle yaw is estimated based on the measured speeds of the un-driven wheels of the vehicle, and various other conditions are utilized to determine if the estimated yaw rate is valid for control purposes. When it is determined that the estimated yaw rate is valid, a closed-loop yaw rate feedback control strategy is employed, whereas in conditions under which it is determined that the estimated yaw rate is not valid, a different control strategy, such as an open-loop feed-forward control of vehicle yaw, is employed. The validity of the estimated yaw rate is judged based on a logical analysis of the measured wheel speed information, braking information, and steering wheel angle. The measured speeds of the un-driven wheels are used to compute an average un-driven wheel speed and an average un-driven wheel acceleration. The operator steering angle and the vehicle velocity are used to determine a desired yaw rate, which is compared to the yaw estimate to find a yaw rate error. Based on these variables, the control reliably determines whether the estimated yaw rate is valid, and selects an appropriate control methodology in accordance with the determination.

9 Claims, 6 Drawing Sheets

U.S. PATENT DOCUMENTS

| | | | |
|---|---|---|---|
| 5,229,944 | 7/1993 | Yasuno | 364/426.01 |
| 5,275,475 | 1/1994 | Hartmann et al. | 303/103 |
| 5,311,431 | 5/1994 | Cao et al. | 364/424.05 |
| 5,341,297 | 8/1994 | Zamotor et al. | 364/426.03 |
| 5,366,281 | 11/1994 | Littlejohn | 303/3 |
| 5,402,342 | 3/1995 | Ehret et al. | 364/424.05 |
| 5,444,621 | 8/1995 | Matsunaga et al. | 364/424.05 |
| 5,480,219 | 1/1996 | Kost et al. | 303/146 |
| 5,915,800 * | 6/1999 | Hiwatashi et al. | 303/146 |
| 5,931,546 * | 8/1999 | Nakashima et al. | 303/146 |
| 5,941,919 * | 8/1999 | Pastor et al. | 701/36 |
| 5,948,027 * | 9/1999 | Oliver, Jr. et al. | 701/37 |

FOREIGN PATENT DOCUMENTS

| | | | |
|---|---|---|---|
| 42 23 385 A1 | 1/1994 | (DE) | |
| 42 29 504 A1 | 3/1994 | (DE) | |
| 43 11 077 A1 | 10/1994 | (DE) | |
| 43 14 827 A1 | 11/1994 | (DE) | |
| 0 555 860 A1 | 8/1993 | (EP) | |
| 2 275 551 | 1/1993 | (GB) | |
| 2 263 340 | 7/1993 | (GB) | |
| 2 269 571 | 2/1994 | (GB) | |
| 2 275 312 | 8/1994 | (GB) | |
| 40 52 62213 | 10/1993 | (JP) | B60T/8/32 |
| 40 60 24304 | 2/1994 | (JP) | B60T/8/24 |
| 40 60 87421 | 3/1994 | (JP) | B60T/8/32 |
| 40 61 15418 | 4/1994 | (JP) | B60T/8/24 |
| 40 61 27354 | 5/1994 | (JP) | B60T/8/24 |

OTHER PUBLICATIONS

Mercedes/Bosch ESP; Automotive Industries, Apr. 1995.

Controlling Vehicle Stability; Christopher A. Sawyer, Automotive Industries, Jan. 1995.

Let Magic Fingers do the Driving: Wards Auto World; May 1995.

Technoid: Intelligent Brakes are on the Way; Car and Driver, Aug. 1994.

Toyota Vehicle Stability Control System; Automotive Engineering, Aug. 1995.

Vehicle Dynamics Offers New Level of Safety: Machine Design, Sep. 1994.

Handling Control Systems for Your Car: Popular Electronics; Feb. 1995.

VDC, The Vehicle Dynamics Control System of Bosch: A. VanZanten, R. Erhardt and G. Pfaff; Robert Bosch GmbH; No. 950759, pp. 9–26.

Active Stability Control; Junichi Kubokawa, Aisin Seiki Co., Ltd., Electronics & Brake Division; Abstract; Sep. 1995.

Consideration of Lateral and Longitudinal Vehicle Stability by Function Enhanced Brake and Stability Control System; Heinz Leffler; SAE #940832; Feb. 28–Mar. 3, 1994.

Control of Vehicle Dynamics: Automotive Engineering; pp. 87–93; May 1995.

Improvement of Vehicle Maneuverability by Direct Yaw Moment Control; Y. Shibahata, K. Shimada and T. Tomari; Society of Automotive Engineers of Japan, Inc.; pp. 464–481.

Spin Control for Cars; Steven Ashley; Mechanical Engineering; pp. 66–68; Jun. 1995.

* cited by examiner

US 6,205,391 B1

VEHICLE YAW CONTROL BASED ON YAW RATE ESTIMATE

FIELD OF THE INVENTION

This invention relates to vehicle yaw control that does not require a yaw sensor, wherein the validity of an estimate of vehicle yaw is determined and used to select an appropriate control methodology.

BACKGROUND OF THE INVENTION

Chassis control technology has achieved noteworthy progress, thanks to advancements in sensing and computing technologies as well as advances in estimation and control theory. This has permitted the design of various control systems using active means to achieve a more maneuverable vehicle. One such enhancement is the control and adjustment of the tire forces through the braking force distribution control strategy, using a steering wheel angle sensor, a lateral accelerometer, and a yaw rate sensor to devise a yaw rate feedback control. Because the price of these different sensors, especially the yaw rate sensor, is still high, this technology is limited to a small number of vehicles. While the vehicle yaw rate can be computed as a function of the measured speeds of the un-driven wheels, the estimate fails to faithfully track the actual vehicle yaw during braking or when the vehicle exhibits an oversteer condition. What is desired is a yaw control that does not require a yaw sensor, but that can reliably control yaw even during conditions that degrade the validity of the estimated or computed yaw.

SUMMARY OF THE PRESENT INVENTION

The present invention is directed to an improved vehicle yaw control that does not require a yaw sensor, wherein the validity of an estimate of vehicle yaw is determined and used to select an appropriate control methodology. According to this invention, the vehicle yaw is estimated based on the measured speeds of the un-driven wheels of the vehicle, and various other conditions are utilized to determine if the estimated yaw rate is valid for control purposes. When it is determined that the estimated yaw rate is valid, a closed-loop yaw rate feedback control strategy is employed, whereas in conditions under which it is determined that the estimated yaw rate is not valid, a different control strategy, such as an open-loop feed-forward control of vehicle yaw, is employed.

According to the invention, the validity of the estimated yaw rate is judged based on a logical analysis of the measured wheel speed information, braking information, and steering wheel angle. The measured speeds of the un-driven wheels are used to compute an average un-driven wheel speed and an average un-driven wheel acceleration. The operator steering angle and the vehicle velocity may be used to determine a desired yaw rate, which is compared to the yaw estimate to find a yaw rate error. Based on these variables, the control reliably determines whether the estimated yaw rate is valid, and selects an appropriate control methodology in accordance with the determination.

BRIEF DESCRIPTION OF THE DRAWINGS

FIG. 4 is directed to a Brake Disturbance status check; FIG. 5 is directed to a Straight-Line status check; FIG. 6 is directed to a Yaw Rate Error status check; FIG. 7 is directed to an Onset of Instability status check; FIG. 8 is directed to a Brake Disturbance History status check; FIG. 9 is directed to a Spin Detection status check; and FIG. 10 is directed to a Yaw Rate Valid status check.

DETAILED DESCRIPTION OF THE INVENTION

Figure 1:
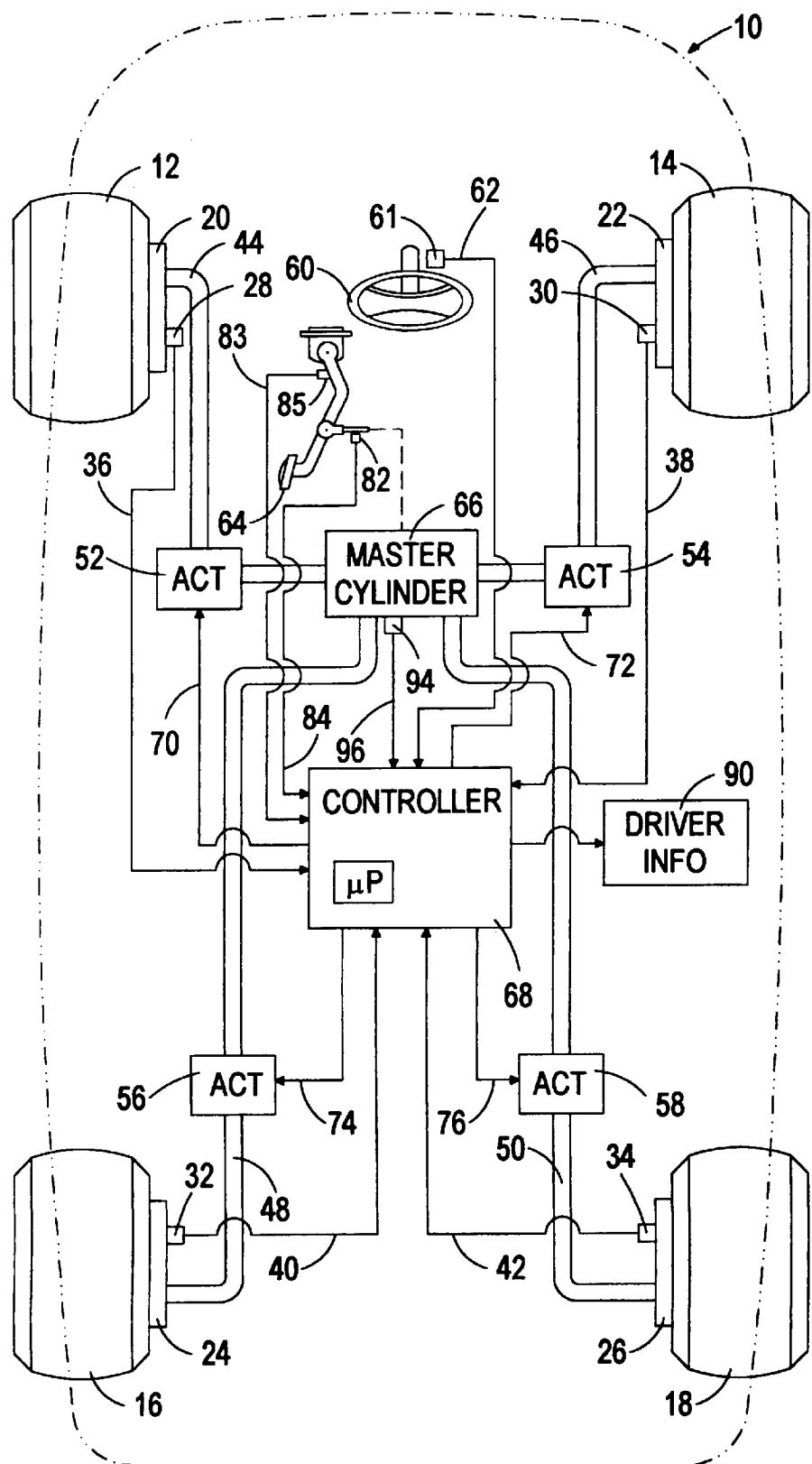
FIG. 1 is a diagram of a vehicle including an electronic controller and associated input and output devices constituting a control system for carrying out an active brake control of vehicle yaw.

FIG. 1 depicts a mechanization of an active brake control according to this invention on a vehicle 10. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal travel signal on line 83 from pedal travel sensor 82; a steering wheel angle signal on line 62 from angle sensor 61; and a master cylinder pressure signal on line 96 from the pressure sensor 94. The sensors 28, 30, 32, 34, 61, 82, 85, 94 may be implemented with conventional devices in a manner known to those skilled in the art.

Under certain conditions such as wheel lock-up or spinning, or lateral instability, the controller 68 modifies the normal braking of one or more wheel 12, 14, 16, 18 via the respective actuators 52, 54, 56, 58 in order to restore a desired overall operation of the vehicle. In an incipient lock-up condition, the controller 68 commands one or more of the respective actuator(s) 52, 54, 56, 58 to modulate the brake force developed at the wheel(s) experiencing the condition. In a wheel slip condition, the controller 68 commands one or more of the respective actuator(s) 52, 54, 56, 58 to develop brake force at the slipping wheel(s). In a case of lateral instability, the controller 68 commands one or more of the respective actuator(s) 52, 54, 56, 58 to selectively increase or decrease the brake forces generated at the various wheels 12, 14, 16, 18 to produce a commanded yaw or differentially brake the vehicle wheels to impart a yaw moment; the control may be carried in a two-channel system in which only the front brakes 20, 22 are controlled, or a four-channel system in which all four brakes 20, 22, 24, 26 are controlled. Exemplary actuators are shown and described in detail in the U.S. Pat. No. 5,366,291, assigned to the assignee of the present invention.

Figure 2:
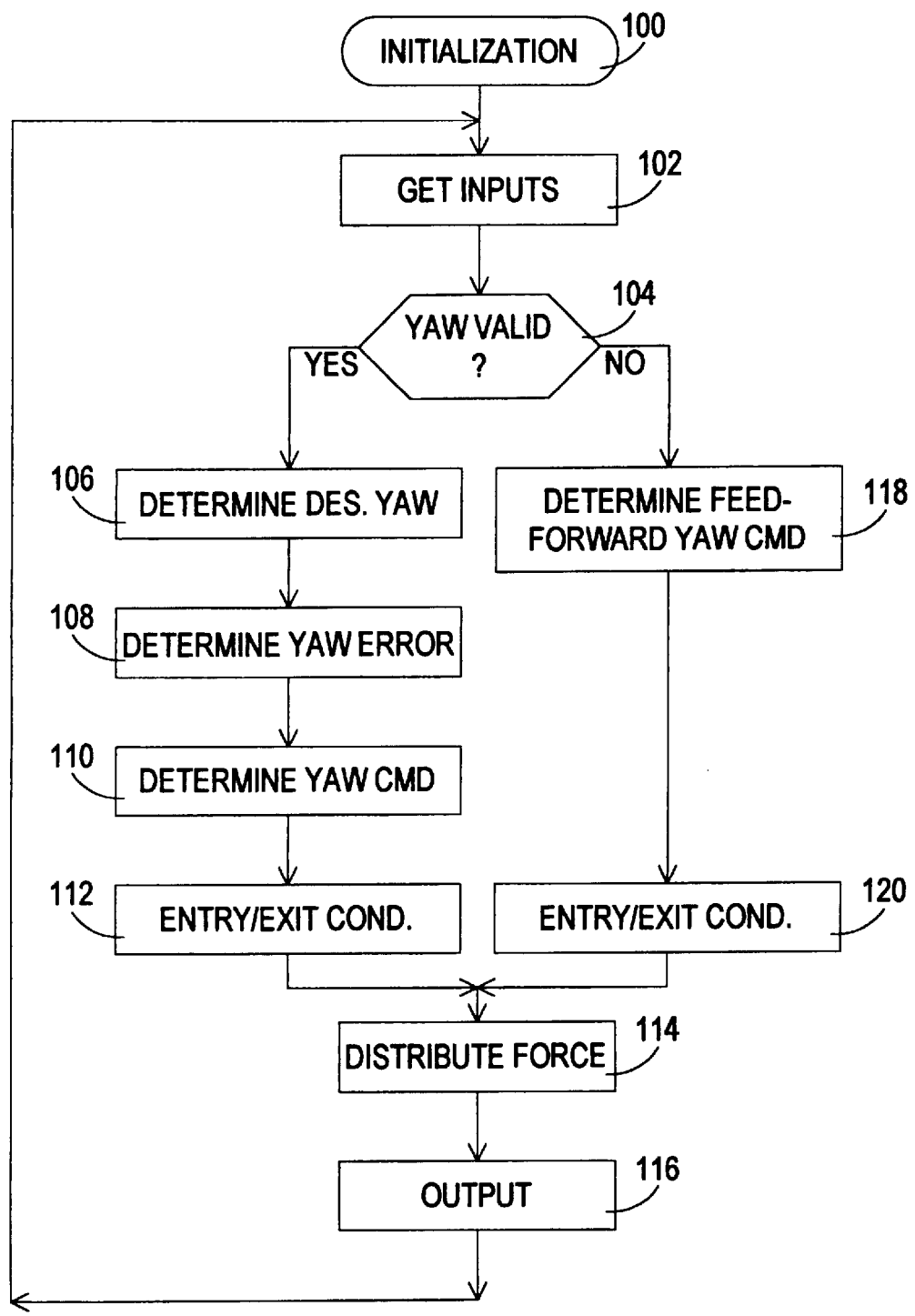
FIG. 2 is a main flow diagram representative of computer instructions executed by the electronic controller of FIG. 1 in carrying out the control of this invention.

A main flow diagram for carrying out a control according to this invention is depicted in FIG. 2. The block 100 designates a series of initialization instructions executed at the initiation of vehicle operation for appropriately setting the initial condition or state of the various terms and flags referred to below. After reading the various sensor inputs at block 102, the block 104 is executed to determine the status of the YAW VALID FLAG. The status of the YAW VALID FLAG indicates whether the estimated yaw value is considered to be valid, and the status of the flag is periodically determined by the interrupt service routine of FIG. 3, described below.

If the estimated yaw rate is considered to be valid (i.e., YAW VALID FLAG=1), the blocks 106–112 are executed to determine a closed-loop yaw command. Block 106 determines a desired yaw value for the vehicle based on various inputs including the vehicle speed and the measured steering wheel angle. Block 108 determines the yaw error based on the deviation of the yaw estimate from the desired yaw rate. Block 110 determines a yaw rate command based on the yaw rate error and suitable gain factors, and block 112 decides if active brake control is warranted based on predefined entry and exit conditions.

If the estimated yaw rate is considered to be invalid (YAW VALID FLAG=0), the blocks 118–120 are executed to determine an open-loop or feed-forward yaw command based on various inputs including the vehicle speed and the measured steering wheel angle. For example, a desired yaw rate value $\Omega_{des}$ may be determined according to the expression:

$$\Omega_{des} = V_x \delta / (L + K_u V_x^2) \quad (1)$$

where L is wheel base of the vehicle, and $K_u$ is an understeer coefficient, and the yaw command may be determined with conventional proportional and derivative control gains. Block 120 decides if active brake control is warranted based on predefined entry and exit conditions, which may differ from the entry and exit conditions designated at block 112.

Finally, block 114 carries out an algorithm for distributing braking forces between the left and right vehicle wheels, and block 116 applies corresponding brake control signals to the brake actuators 152–158. Preferably, braking is only applied to the driven wheels of the vehicle so as to not corrupt the yaw estimate. Various brake distribution strategies may be utilized, exemplary strategies being disclosed in the U.S. patent applications Ser. Nos. 08/654,982 and 08/732,582, both of which are assigned to the assignee of the present invention.

Figure 3:
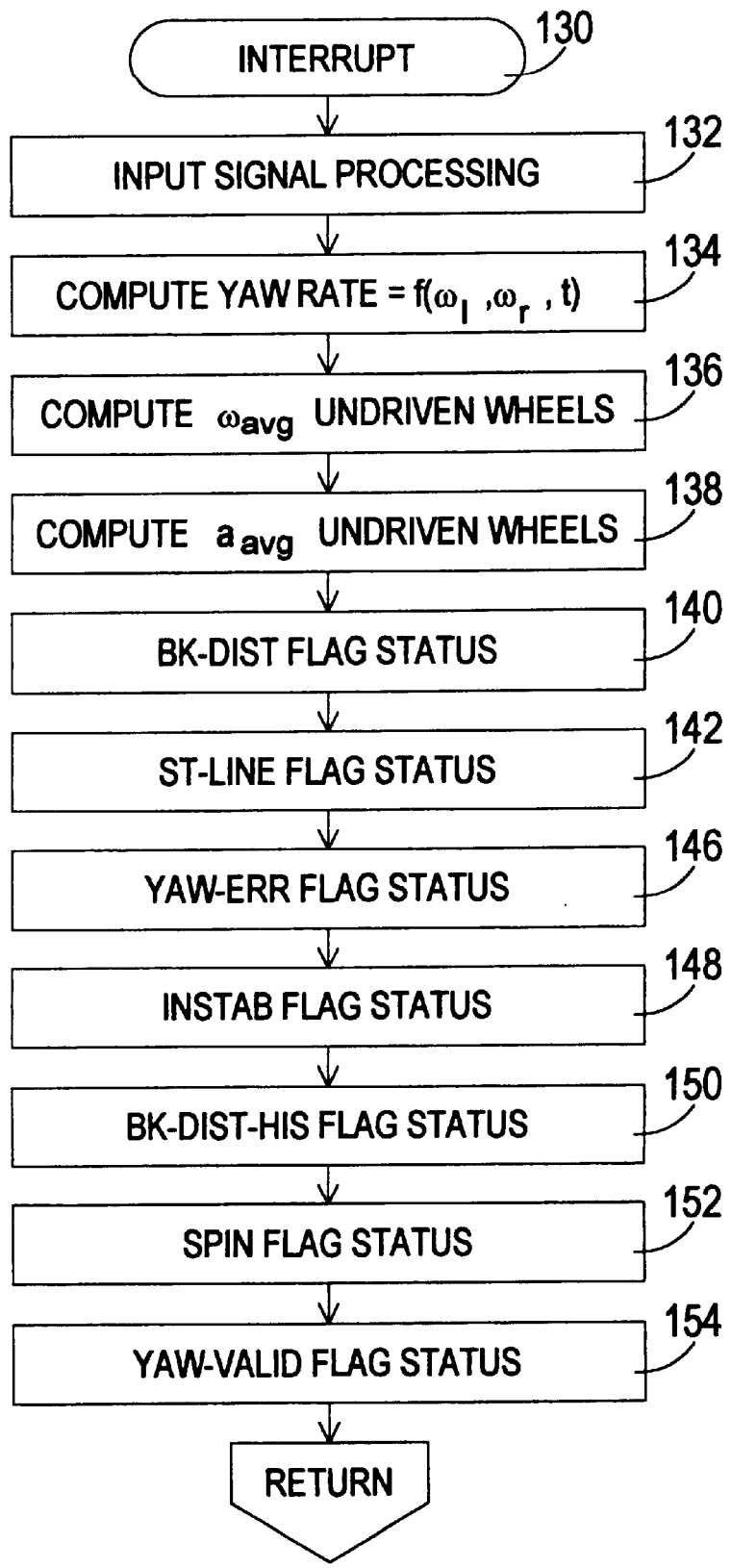
FIG. 3 is flow diagram of an interrupt service routine executed by the electronic controller of FIG. 1 to determine the validity of a yaw estimate according to this invention.

As indicated above, FIG. 3 is a flow diagram for an interrupt service routine which is executed in response to a periodic interrupt request to determine the status of the YAW VALID FLAG. Block 132 designates input signal processing such as filtering of the wheel speed signals to reject noise or unwanted information. The yaw rate is then estimated as a function of the left and right un-driven wheel speeds $\omega_l$ and $\omega_r$, and the track t of the vehicle, as indicated at block 134. In the usual application, the vehicle has a front-wheel drive powertrain, and the un-driven wheels are the left and right rear wheels 16 and 18. In the illustrated embodiment the estimated yaw rate $\dot{\psi}_e$ is determined according to the expression:

$$\dot{\psi}_e = \frac{\omega_l - \omega_r}{t} \quad (2)$$

Block 136 then determines the simple arithmetic average $\omega_{avg}$ of speeds of the un-driven wheels, and block 138 estimates the average acceleration $a_{avg}$ of the un-driven wheels. The average acceleration $a_{avg}$ may be estimated as a function of current and previous speed and acceleration values according to the following expression, where the designation (k) refers to the current control loop, and the designation (k–1) refers to the prior control loop:

$$\hat{\omega}_{av}(k)=(1-Tg_1)\hat{\omega}_{av}(k-1)+Tg_1\omega_{av}(k)+T\hat{a}_{av}(k-1)\hat{a}_{av}(k)=\hat{a}_x(k-1)+Tg_2(\omega_{av}(k)-\hat{\omega}_{av}(k)) \quad (3)$$

where T is the sampling time or period, and the gain terms $g_1$ and $g_2$ are given by the following expressions:

$$g_1=2\xi(2\pi f_n), \text{ and } g_2=(2\pi f_n)^2 \quad (4)$$

where $\xi$ is the desired damping ratio, and $f_n$ is the desired bandwidth. The damping ratio $\xi$ governs the convergence of the estimated and true acceleration, while the bandwidth $f_n$ determines the maximum frequency content of the acceleration to be included in the estimation.

Figure 4:
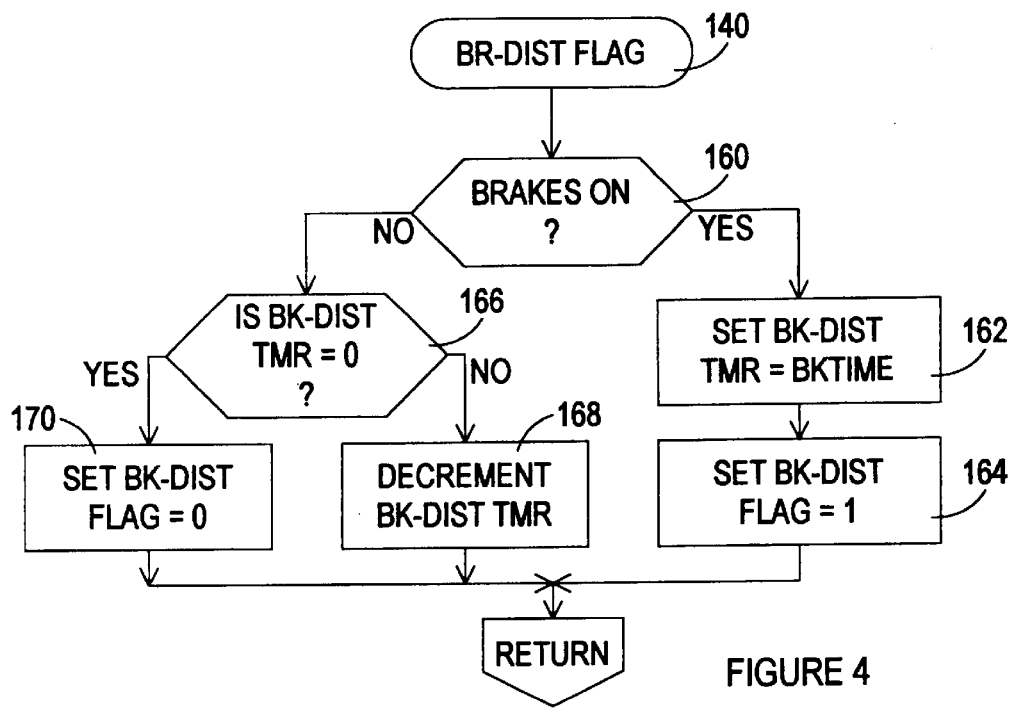
FIGS. 4–10 are flow diagrams setting forth further detail regarding the various flow diagram steps of FIG. 3.
Figure 5:
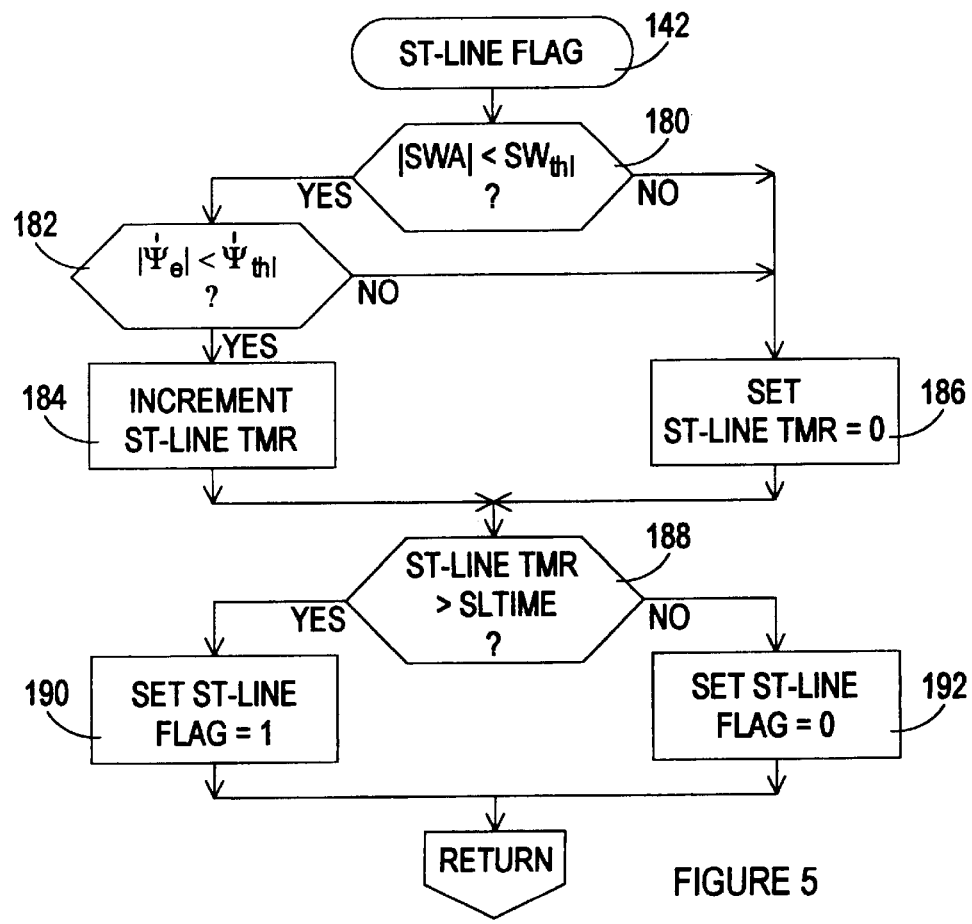
Figure 7:
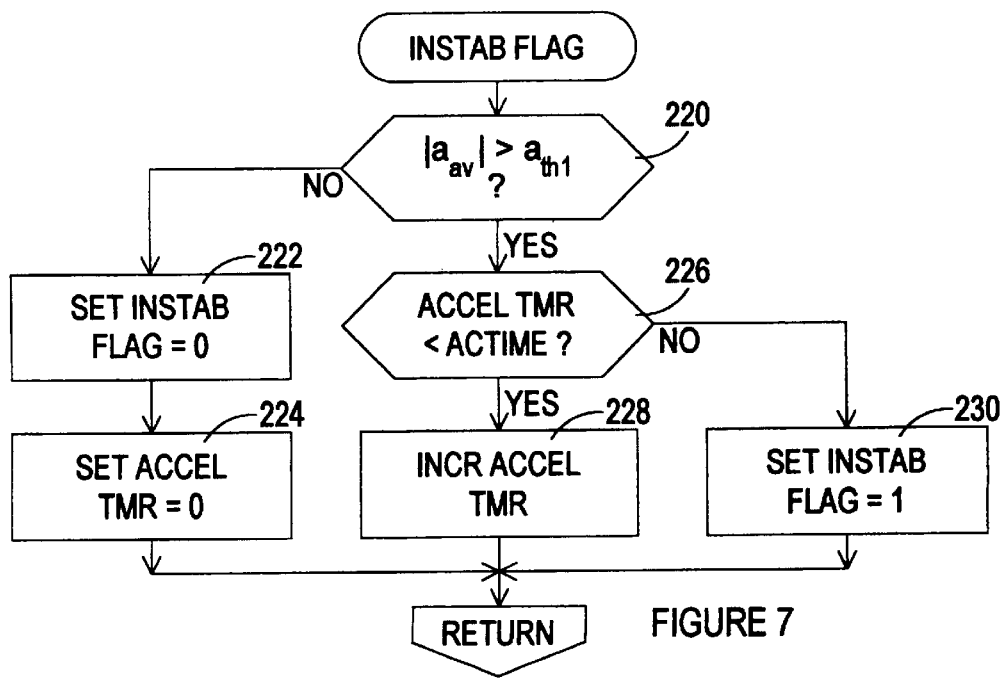
Figure 8:
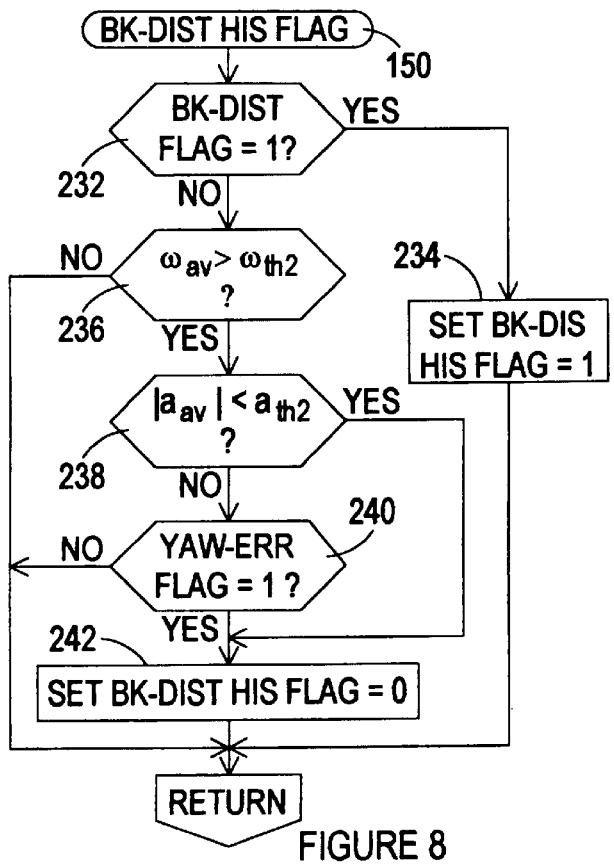
Figure 9:
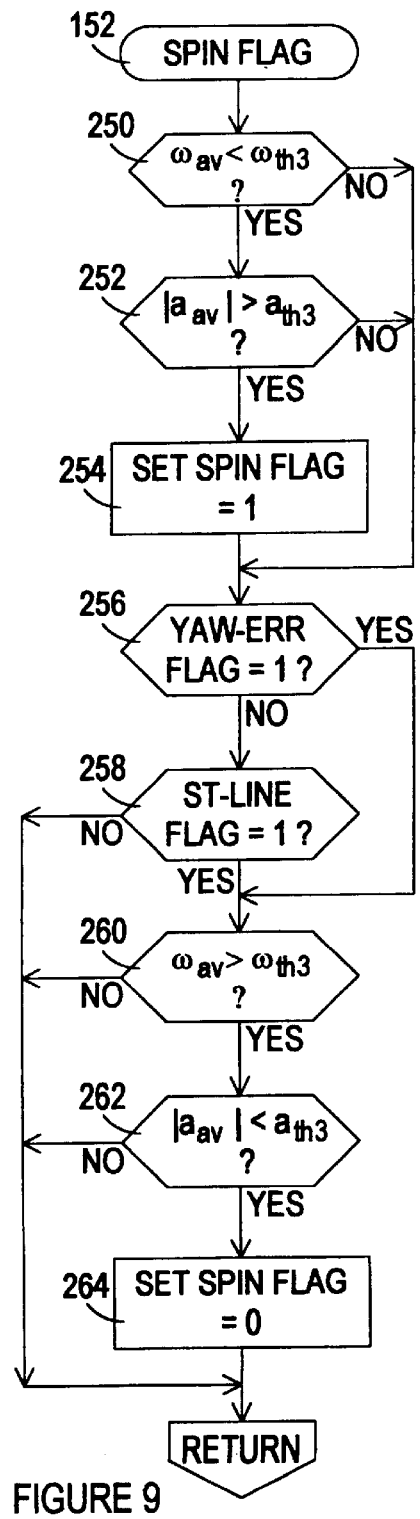

Blocks 140–152 are then executed to determine the status of a number of flags which indicate the presence or absence of various predefined operating conditions relevant to the validity of the yaw rate determined at block 134. Block 140 concerns the status of a Brake Disturbance flag (BK-DIST FLAG), described in detail below in reference to the flow diagram of FIG. 4. Block 142 concerns the status of a Straight Line flag (ST-LINE FLAG), described in detail below in reference to the flow diagram of FIG. 5. Block 146 concerns the status of a Yaw Error flag (YAW-ERR FLAG), described in detail below in reference to the flow diagram of FIG. 6. Block 148 concerns the status of An Onset of Instability flag (INSTAB FLAG), described in detail below in reference to the flow diagram of FIG. 7. Block 150 concerns the status of a Brake Disturbance History flag (BK-DIST HIS FLAG), described in detail below in reference to the flow diagram of FIG. 8. Block 152 concerns the status of a Spin Detection flag (SPIN FLAG), described in detail below in reference to the flow diagram of FIG. 9. Finally, block 154 concerns the status of the Yaw Rate Valid flag (YAW-VALID FLAG) referred to at block 104 of the main flow diagram of FIG. 2, and is detailed below in reference to the flow diagram of FIG. 10.

The Brake Disturbance flag (BK-DIST FLAG) is intended to indicate the presence of a brake disturbance. This flag is used in determining the status of the Brake Disturbance History flag (BK-DIST HIS FLAG) described below in reference to the flow diagram of FIG. 8. If the service brakes are applied, as determined at block 160 of FIG. 4, blocks 162–164 are executed to initialize a timer or counter referred to herein as the Brake Disturbance Timer (BK-DIST TMR) to a predetermined value, designated as BKTIME, and to set the BK-DIST FLAG=1. Once the brakes are released, the blocks 166–168 are executed to decrement the Brake Disturbance Timer at each interrupt until the timer value has been decremented to zero. At such point, block 166 will be answered in the affirmative, and block 170 is executed to set BK-DIST FLAG=0. Thus, the BK-DIST FLAG is set at the initiation of braking, and reset a predefined time after the brakes have been released.

The Straight Line flag (ST-LINE FLAG) is intended to indicate whether the vehicle 10 is heading straight; that is, not turning. This flag is used in determining the status of the SPIN flag (SPIN FLAG) described below in reference to the flow diagram of FIG. 9. If the steering wheel angle (SWA) in either direction is less than a reference angle ($SWA_{th1}$) and the estimated yaw rate $\dot{\psi}_e$ in either direction is less than a reference rate $\dot{\psi}_{th1}$, as determined by blocks 180 and 182 of FIG. 5, the block 184 is executed to increment a timer or counter referred to herein as the Straight Line Timer (ST-LINE TMR). Otherwise, block 186 is executed to reset the Straight Line Timer to zero. So long as the value or count of ST-LINE TMR is less than a reference time designated as SLTIME, as determined at block 188, the block 192 sets the ST-LINE FLAG=0. Once the value or count of ST-LINE TMR exceeds SLTIME, the block 190 sets the ST-LINE FLAG=1. Thus, the ST-LINE FLAG is maintained in a reset (0) condition until straight line driving conditions (steering wheel angle and yaw) have been established for a predefined period of time.

The Yaw Rate Error flag (YAW-ERR FLAG) is intended to indicate whether the vehicle 10 is in a linear operating region, based on the deviation of the estimated yaw value $\dot{\psi}_e$ from the desired yaw value determined at blocks 106 or 118.

Figure 6:
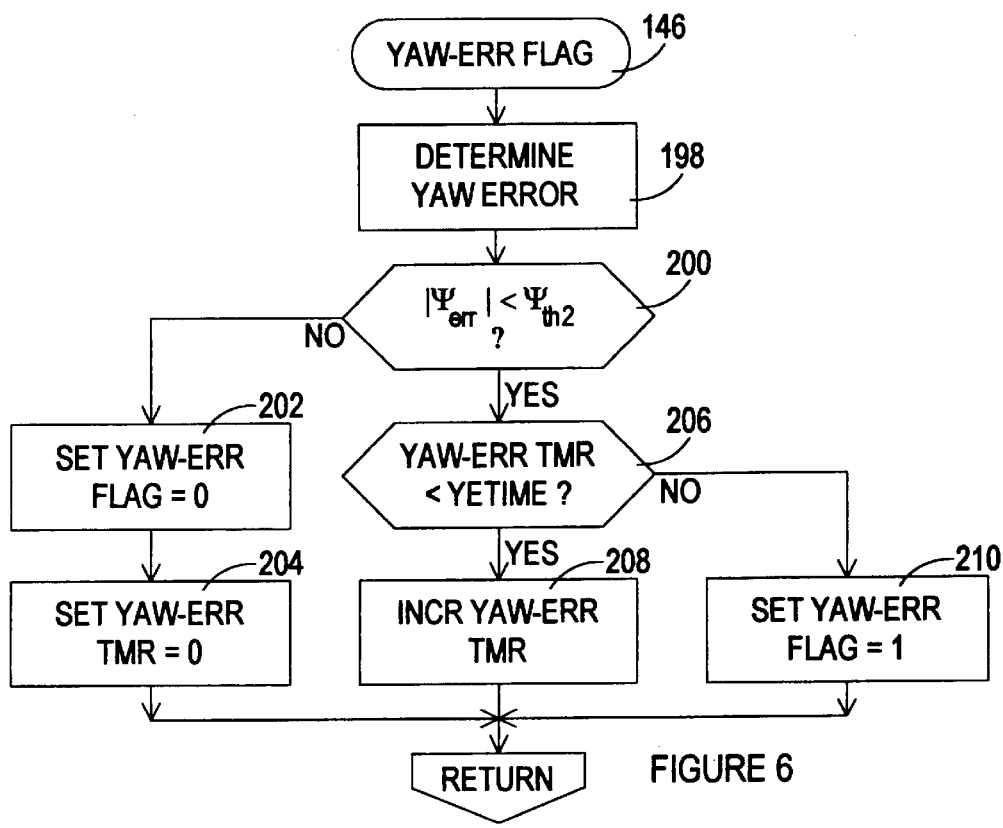

This deviation, referred to herein as the yaw error, or $\psi_{err}$, is determined at block 198 of FIG. 6. If the yaw error $\psi_{err}$ in either direction is at least as great as a threshold error $\psi_{th2}$, as determined by block 200, the blocks 202 and 204 are executed to set the YAW ERROR FLAG=0, and to reset a timer or counter referred to herein as the Yaw Error Timer (YAW-ERR TMR). If the yaw error is within the threshold error, blocks 206–208 increment the Yaw Error Timer at each interrupt until the value or count reaches a predefined time designated as YETIME. At such point, the block 210 sets the YAW-ERR FLAG=1. Thus, the YAW-ERR FLAG is maintained in a reset (0) condition until a linear operating condition (based on yaw error) has been established for a predefined period of time. This flag is used in determining the status of the Brake Disturbance History and Spin flags described below in reference to the flow diagrams of FIGS. 8 and 9, respectively.

The Onset of Instability flag (INSTAB FLAG) is intended to indicate the presence of a condition in which the vehicle 10 has a tendency to become unstable, based on the average acceleration $a_{avg}$ of the un-driven wheels. As noted below in reference to FIG. 10, the YAW VALID FLAG is reset to zero if INSTAB FLAG=1, indicating the presence of such a condition. If the average acceleration $a_{avg}$ in either direction is within a threshold acceleration $a_{th1}$, as determined by block 220 in FIG. 7, the blocks 222 and 224 are executed to set the INSTAB FLAG=0, and to reset a timer or counter referred to herein as the Acceleration Timer (ACCEL TMR). If the average acceleration is outside the threshold, blocks 226–228 increment the Acceleration Timer at each interrupt until the value or count reaches a predefined time designated as ACTIME. At such point, the block 230 sets the INSTAB FLAG=1. Thus, the INSTAB FLAG is maintained in a reset (0) condition until the average acceleration of the un-driven wheels exceeds a threshold for a predefined period of time.

The Brake Disturbance History flag (BK-DIST HIS FLAG) is intended to indicate the presence of braking that would corrupt the yaw rate estimate of expression (2), above. As noted below in reference to FIG. 10, the YAW VALID FLAG is reset to zero if BK-DIST HIS FLAG=1, indicating the presence of such braking. If the BK-DIST FLAG described above in reference to the flow diagram of FIG. 4 is set, as determined at block 232 of FIG. 8, the block 234 is executed to set BK-DIST HIS FLAG=1. If the BK-DIST FLAG=0, indicating that the brakes have been released for a predefined time, the blocks 236–240 are executed to determine if the BK-DIST HIS FLAG should be reset, based on the average speed and acceleration of the un-driven wheels, and the status of the YAW-ERR FLAG, described above in reference to the flow diagram of FIG. 6. If the average speed $\omega_{avg}$ is greater than a threshold speed $\omega_{th2}$, and the average acceleration $a_{avg}$ in either direction is less than a threshold acceleration $a_{th2}$ or the YAW-ERR FLAG=1 (indicating the presence of a linear operating condition), the block 242 is executed to set BK-DIST HIS FLAG=0. Thus, the BK-DIST HIS FLAG is set as soon as the brakes are applied, and reset after the brakes have been released for a predefined period of time, and the average un-driven wheel speed is greater than a reference, and the average acceleration and yaw error are indicative of linear operation of the vehicle.

The Spin flag (SPIN FLAG) is intended to indicate the occurrence of a vehicle spin-out. As noted below in reference to FIG. 10, the YAW VALID FLAG is reset to zero if SPIN FLAG=1, indicating the occurrence of such a condition. If the average speed $\omega_{avg}$ of the un-driven wheels is less than a threshold speed $\omega_{th3}$, and the average acceleration $a_{avg}$ in either direction is greater than a threshold acceleration $a_{th3}$, as determined at blocks 250–252 in FIG. 9, the block 254 is executed to set SPIN FLAG=1. Blocks 256–262 then determine if the SPIN FLAG should be reset to zero. To clear or reset the flag, three conditions must be met. The first condition, determined by blocks 256–258, requires that either the YAW-ERR FLAG=1 (low yaw error), or that the ST-LINE FLAG=1 (straight vehicle heading). The second and third conditions, determined by blocks 260–262 require that the average speed $\omega_{avg}$ of the un-driven wheels is greater than the threshold speed $\omega_{th3}$, and that the average acceleration $a_{avg}$ in either direction is less than the threshold acceleration $a_{th3}$—i.e., the opposite condition defined by blocks 250–252. If all three conditions are met, the block 264 is executed to set SPIN FLAG=0. Thus, the SPIN FLAG is set if the average speed and acceleration values are indicative of a spin-out condition, and reset if the average speed and acceleration values and the states of the Yaw Error and Straight Line flags indicate stable linear operation.

Figure 10:
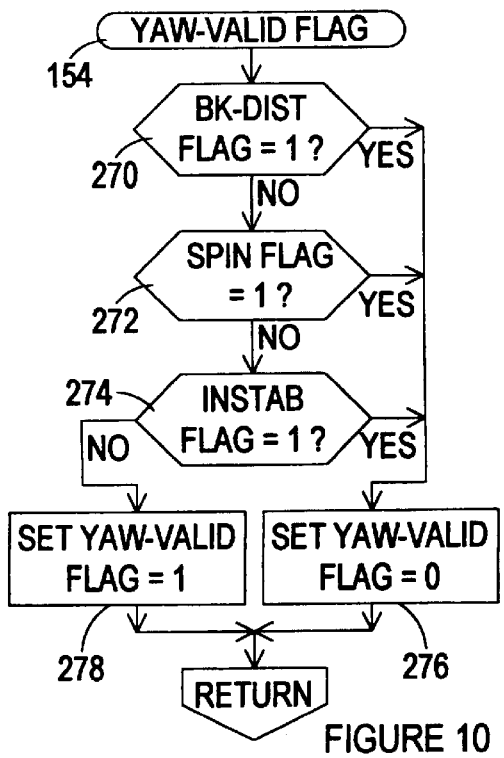

The status of the Yaw Valid flag, determined by the flow diagram of FIG. 10, depends on the status of the Brake Disturbance History, Spin and Onset of Instability flags. If any of these flags are set, as determined at blocks 270–274, the block 276 is executed to set the YAW-VALID FLAG=0, indicating that the yaw estimate determined at block 134 of FIG. 3 should not be used for yaw control; in this case, the open-loop control based on blocks 118–120 is utilized, as described above. If each of the Brake Disturbance History, Spin and Onset of Instability flags are reset to zero, the block 278 is executed to set the YAW-VALID FLAG=1, indicating that the yaw estimate determined at block 134 of FIG. 3 should be used for yaw control; in this case, the closed-loop control based on blocks 106–112 is utilized, as described above.

In summary, this invention provides a low-cost vehicle yaw control that does not require a yaw sensor. An estimate of yaw based on the speeds of the un-driven wheels of the vehicle is utilized for closed-loop control of yaw so long as a logical analysis of other parameters including the un-driven wheel speeds, estimated yaw error, braking and steering wheel angle indicates that the yaw estimate is valid. When the logical analysis indicates that the yaw estimate is no longer valid, an alternate control that does not require yaw feedback (such as the disclosed open-loop feed-forward control) is utilized for control of yaw. Obviously, various modifications of the illustrated embodiment will occur to those skilled in the art, and in this regard, it will be understood that the scope of this invention is not necessarily limited by the illustrated embodiment, but is defined by the appended claims.

The embodiments of the invention in which an exclusive property or privilege is claimed are defined as follows:

1. A yaw control method utilizing differential braking of the vehicle wheels to impart a desired yaw moment on the vehicle, the vehicle having a pair of un-driven wheels, the method comprising the steps of:

measuring speeds of the un-driven wheels of the vehicle;

estimating a yaw rate of the vehicle based on a difference between the measured speeds;

analyzing known vehicle parameters including the measured wheel speeds, a yaw error based on deviation of the estimated yaw rate from a desired yaw rate, vehicle steering angle, and presence of driver braking to determine when the estimated yaw rate is valid and when the estimated yaw rate is invalid;

differentially braking the vehicle wheels to impart a yaw moment based on the deviation of the estimated yaw rate from the desired yaw rate when the estimated yaw rate is determined to be valid;

differentially braking the vehicle wheels to impart a yaw moment based on the desired yaw rate without regard to the estimated yaw rate when the estimated yaw rate is determined to be invalid; and wherein the step of analyzing known vehicle parameters to determine when the estimated yaw rate is valid and when the estimated yaw rate is invalid includes the step of determining that the estimated yaw rate is invalid in response to an indication that the vehicle has a tendency to be unstable.

2. The yaw control method according to claim 1, wherein the desired yaw rate is determined based on the vehicle steering angle, the vehicle velocity, and a desired understeer of the vehicle.

3. The yaw control method according to claim 1, wherein the step of analyzing known vehicle parameters to determine when the estimated yaw rate is valid and when the estimated yaw rate is invalid includes the step of:

determining that the estimated yaw rate is invalid in response to an indication that the vehicle is in a spin-out condition.

4. The yaw control method according to claim 3, including the steps of:

computing an average of the measured wheel speeds, computing an average acceleration of the un-driven wheels based on the computed average of the measured wheel speeds;

generating the indication that the vehicle is in a spin-out condition when the computed average of the measured wheel speeds is less than a predefined speed threshold and the computed average acceleration is greater than a predefined acceleration threshold.

5. The yaw control method according to claim 4, wherein after the indication that the vehicle is in a spin-out condition has been generated, it is maintained even though the computed average of the measured wheel speeds is greater than the predefined speed threshold and the computed average acceleration is less than the predefined acceleration threshold if the steering angle or yaw error fail to fall within predefined thresholds for a predefined period of time.

6. The yaw control method according to claim 1, including the steps of:

computing an average of the measured wheel speeds, computing an average acceleration of the un-driven wheels based on the computed average of the measured wheel speeds;

generating the indication that the vehicle has a tendency to be unstable when the computed average acceleration is greater than a predefined acceleration threshold for at least a predefined period of time.

7. The yaw control method according to claim 6, wherein the indication that the vehicle has a tendency to be unstable is terminated when the computed average acceleration is falls below the predefined acceleration threshold.

8. A yaw control method utilizing differential braking of the vehicle wheels to impart a desired yaw moment on the vehicle, the vehicle having a pair of undriven wheels, the method comprising the steps of:

measuring speeds of the undriven wheels of the vehicle;

estimating a yaw rate of the vehicle based on a difference between the measured speeds;

analyzing known vehicle parameters including the measured wheel speeds, a yaw error based on deviation of the estimated yaw rate from a desired yaw rate, the vehicle steering angle, and presence of driver braking to determine when the estimated yaw rate is valid and when the estimated yaw rate is invalid;

differentially braking the vehicle wheels to impart a yaw moment based on the deviation of the estimated yaw rate from the desired yaw rate when the estimated yaw rate is determined to be valid;

differentially braking the vehicle wheels to impart a yaw moment based on the desired yaw rate without regard to the estimated yaw rate when the estimated yaw rate is determined to be invalid;

wherein the step of analyzing known vehicle parameters to determine when the estimated yaw rate is valid and when the estimated yaw rate is invalid includes the step of determining that the estimated yaw rate is invalid in response to an indication that driver braking is present; and wherein the indication that driver braking is present is maintained for a predefined period of time after driver braking is no longer present.

9. A yaw control method utilizing differential braking of the vehicle wheels to impart a desired yaw moment on the vehicle, the vehicle having a pair of undriven wheels, the method comprising the steps of:

measuring speeds of the undriven wheels of the vehicle;

estimating a yaw rate of the vehicle based on a difference between the measured speeds;

analyzing known vehicle parameters including the measured wheel speeds, a yaw error based on deviation of the estimated yaw rate from a desired yaw rate, the vehicle steering angle, and presence of driver braking to determine when the estimated yaw rate is valid and when the estimated yaw rate is invalid;

differentially braking the vehicle wheels to impart a yaw moment based on the deviation of the estimated yaw rate from the desired yaw rate when the estimated yaw rate is determined to be valid;

differentially braking the vehicle wheels to impart a yaw moment based on the desired yaw rate without regard to the estimated yaw rate when the estimated yaw rate is determined to be invalid; and wherein the step of analyzing known vehicle parameters to determine when the estimated yaw rate is valid and when the estimated yaw rate is invalid includes the step of determining that the estimated yaw rate is invalid in response to an indication that the vehicle is in a spin-out condition.

* * * * *